United States Patent

Nonnenmacher et al.

Patent Number: 5,280,341
Date of Patent: Jan. 18, 1994

[54] FEEDBACK CONTROLLED DIFFERENTIAL FIBER INTERFEROMETER

[75] Inventors: Martin Nonnenmacher, Schoenaich, Fed. Rep. of Germany; Mehdi VaezIravani, Scottsville; Hemantha K. Wickramasinghe, Chappaqua, both of N.Y.

[73] Assignee: International Business Machines Corporation, Armonk, N.Y.

[21] Appl. No.: 842,867

[22] Filed: Feb. 27, 1992

[51] Int. Cl.⁵ .............................................. G01B 11/02
[52] U.S. Cl. ................................... 356/358; 356/345; 250/306; 250/227.19
[58] Field of Search ............... 356/358, 356, 345, 373, 356/375, 381, 380, 382; 250/306, 308, 227.19

[56] References Cited

U.S. PATENT DOCUMENTS

| | | | |
|---|---|---|---|
| 4,378,497 | 3/1983 | Giallorenzi | 250/227 |
| 4,481,219 | 9/1984 | Giallorenzi | 250/227 |
| 4,486,657 | 12/1984 | Bush | 250/227 |
| 4,530,603 | 7/1985 | Shaw et al. | 356/345 |
| 4,603,296 | 7/1986 | Koo et al. | 324/244 |
| 4,627,728 | 12/1986 | Willson | 356/345 |
| 4,652,129 | 3/1987 | Martinelli | 356/345 |
| 4,671,659 | 6/1987 | Rempt et al. | 356/358 |
| 4,717,255 | 1/1988 | Ulbers | 356/345 |
| 4,753,529 | 6/1988 | Layton | 356/345 |
| 4,759,627 | 7/1988 | Thylen et al. | 356/345 |
| 4,799,797 | 1/1989 | Huggins | 356/345 |
| 4,853,534 | 8/1989 | Dakin | 250/227 |
| 4,868,381 | 9/1989 | Davis | 250/227 |
| 4,885,462 | 12/1989 | Dakin | 250/227 |
| 4,887,901 | 12/1989 | Falco et al. | 356/352 |
| 4,918,371 | 4/1990 | Bobb | 324/244 |
| 5,017,010 | 5/1991 | Mamin et al. | 356/345 |
| 5,164,791 | 11/1992 | Kubo et al. | 356/358 |

FOREIGN PATENT DOCUMENTS

G02B 5/14 10/1983 European Pat. Off. .
0398319A3 5/1990 European Pat. Off. .
WO92/04594 3/1992 PCT Int'l Appl. .
2181538A 4/1987 United Kingdom .

OTHER PUBLICATIONS

"Force microscope using a fiber optic displacement sensor", D. Rugar et al., Nov. 1988, pp. 2337-2340, American Insstitue of Physics. vol. 59, No. 11.
K. Hayashi et al., Stabilized Vibrational Amplitude Measuring Systems Using Laser Diode And Optical Fiber, Tran. of the IECE of Japan vol. E69, of No. 4, Apr. 1986.

*Primary Examiner*—Samuel A. Turner
*Assistant Examiner*—LaCharles P. Keesee
*Attorney, Agent, or Firm*—Perman & Green

[57] ABSTRACT

A differential fiber interferometer includes first and second optical fibers that pass through a coupler which has both input and output ends. A laser optically energizes a first one of the fibers and, via the coupler, the second fiber. A telescope lens system focuses optical beams from the first and second fibers onto an object and receives reflections therefrom for retrotransmission. The object is caused to oscillate at a first frequency so as to modulate the phase of the reflected optical beams. An optical sensor, positioned on the input side of the coupler, converts to electrical signals the reflected optical energy that appears on the second fiber. The reflected energy includes optical energies from both the first and second fibers. A first detector is responsive to the sensor's electrical outputs to produce a signal that is proportional to the differential phase between the reflected optical energies. A second feedback detector is coupled between the sensor and the second fiber and phase adjusts optical signals on the second fiber to compensate for environmental fluctuations of the second fiber.

9 Claims, 2 Drawing Sheets

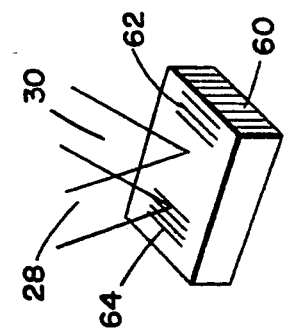
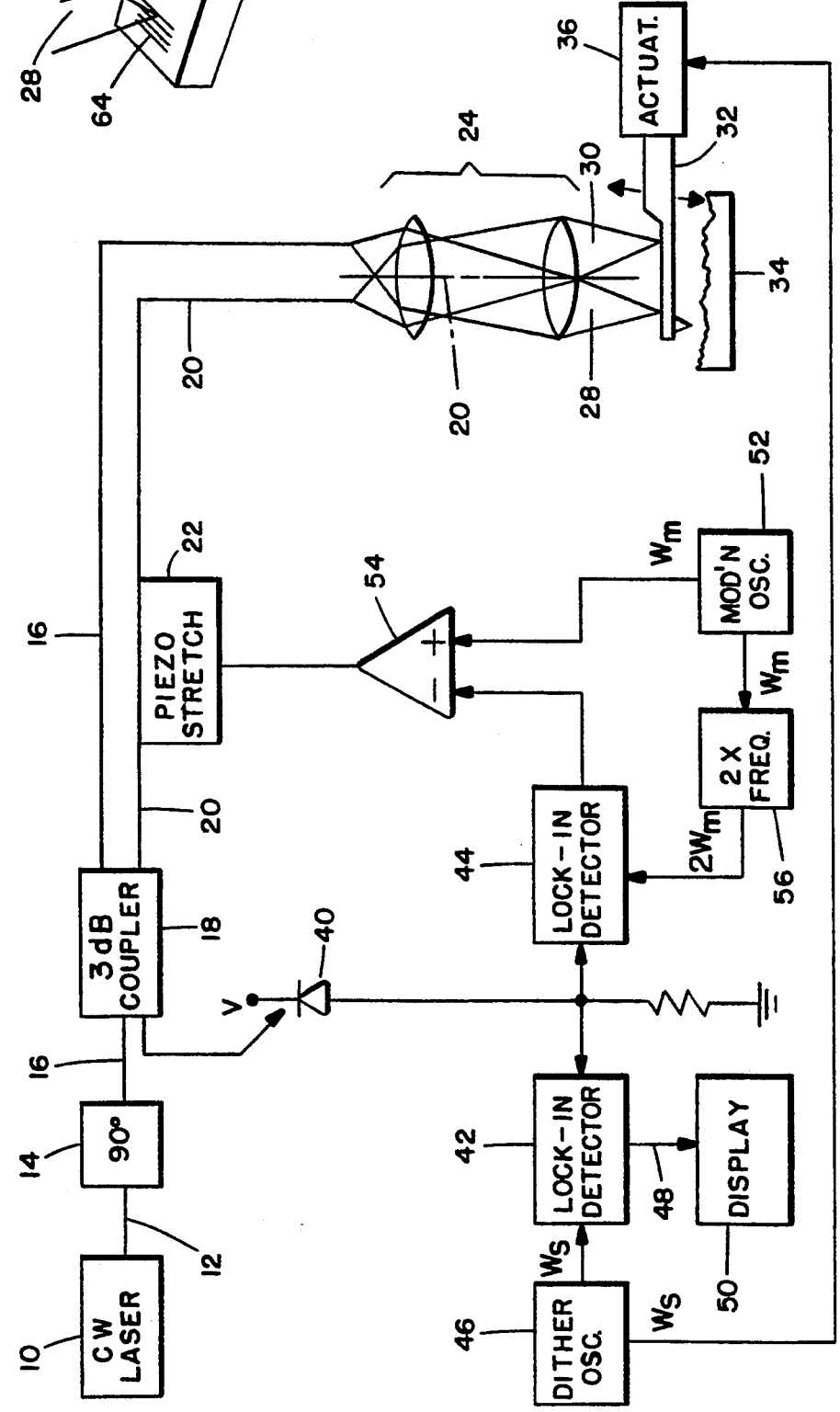

FEEDBACK CONTROLLED DIFFERENTIAL FIBER INTERFEROMETER

FIELD OF THE INVENTION

This invention relates to interferometers, and more particularly, to a position sensing interferometer that employs feedback to adjust for long term instabilities brought about by thermal and other environmental fluctuations.

BACKGROUND OF THE INVENTION

In an atomic force microscope, small scale variations are detected in the position of a probe tip that is in close proximity to a sample being scanned. Depending on the nature of the interaction, the tip is operated either in a dynamic or static mode. Consequently, it is desirable to sense the motion of the tip with a system which is capable of detecting AC, DC and quasi-DC (slowly varying) changes in position of the tip. A fundamental consideration for such sensing systems is the need for detection sensitivities in the range of minute fractions of a nanometer. This clearly implies an immunity to environmental changes such as temperature and pressure induced microphonics.

A variety of techniques have been employed to enable high precision position sensing, e.g., AC laser heterodyne interferometers; reflections of a focused laser beam off a surface; an all-fiber optic Sagnac interferometer, etc. Heterodyne interferometers are complicated systems requiring precise alignment of their components. Laser reflection techniques are limited in their capacity to reject microphonics. Fiber optic systems are potentially more compact, however, neither they nor heterodyne interferometers respond to DC or quasi-DC deflections.

One exception is a fiber system in which interference occurs between a sample's reflected light and that reflected off a fiber end. However, in such a system there is no direct way of insuring continuous operations at a maximum, stable, sensitivity. (see Rugar et al, "Force Microscope Using a Fiber-Optic Displacement Sensor", Review of Scientific Instruments 59(11) November, 1988, pp. 2337–2340.

The patent art is replete with interferometric systems which have been applied to various applications. In U.S. Pat. No. 4,717,255 to Ulbers, an optical interferometer is shown that measures the position of a sensing tip that is following an irregular surface. It does not consider any method for the elimination of residual drift due to microphonics. U.S. Pat. No. 4,671,659 to Rempt et al. describes an optical interferometer that uses expansions and contractions of a test article to cause changes in the length of a measurement fiber that is adhered thereto. U.S. Pat. No. 4,652,129 to Martinelli, describes a Michelson interferometer that combines a reflected measurement signal with a reference signal and thereby enables induced noise to be suppressed. U.S. Pat. No. 4,753,529 to Layton describes a Mach-Zehnder interferometer wherein a difference in path-length between a pair of fibers is determined by alteration of the optical source frequency.

U.S. Pat. No. 4,378,497 to Giallorenzi employs a magnetostrictive element to stretch a fiber section to enable a change in phase shift therethrough. No distinction is made between laser fluctuations and low frequency fluctuations in the feedback system that is used to control the magnetostrictive element. U.S. Pat. No. 4,799,797 to Huggins describes a multiplexed optical sensor system employing an interferometric arrangement. It employs phase error compensation that is based on a DC technique which is susceptible to laser light fluctuations. U.S. Pat. No. 4,603,296 to Koo et al. is a further interferometer that employs DC compensation. This interferometer is used as a magnetometer.

U.S. Pat. No. 5,017,010 to Mamin et al describes an interferometer that is applied to the sensing of an atomic force microscope probe. The system employs light reflected from the probe (and from the polished end of a fiber adjacent the probe) to achieve an interferometric combination of reflected beams. A photodetector senses a portion of the injected light as a reference which is used subtractively to negate power fluctuations of the laser. European published patent application WO 83/03684 to Kino et al illustrates a Sagnac interferometer that is employed to determine surface changes occurring in a surface acoustic wave device. Because the system is a Sagnac interferometer, it is not able to make DC or low frequency measurements.

The following prior art describes interferometers which employ correction systems for thermal and microphonic effects. U.S. Pat. No. 4,627,728 to Willson employs two Fabry-Perot interferometers, one for sensing and the other for correction purposes. The system is employed for magnetic field strength sensing. U.S. Pat. No. 4,471,219 to Giallorenzi is a magnetic field sensor which includes an acoustic circuit for nulling responses in the detector due to acoustic perturbations. One embodiment modulates the axial alignment of fibers in an end to end configuration by means of magnetic material. A second embodiment modulates the coupling between the fibers using a magnetostrictive material. U.S. Pat. No. 4,759,627 to Thylen et al describes a Mach-Zehnder interferometer that employs a difference signal for compensation. The compensation signal is a representation of the parameter to be measured and no distinction is made between spurious variations and the wanted signal.

U.S. Pat. No. 4,486,657 to Bush describes a fiber optic acoustic sensing system wherein one modulator maintains an interferometer locked in-phase by effectively cancelling out a phase change produced by temperature and acoustic pressure fluctuations. To effect this cancellation, the modulator inversely duplicates the phase shift to produce the desired output signal. U.S. Pat. No. 4,530,603 of Shaw et al. describes a fiber optic sensor that includes a feedback system for stabilizing a fiber loop against low frequency thermal drift. The system is employed to sense acoustic waves that modify the phase shift through the fiber loop.

Other prior art describing interferometer systems with sensitivity and stabilization adjustments means can be found in the following U.S. Pat. Nos.: 4,918,371 to Bobb; 4,887,901 to Falco et al; 4,868,381 to Davis; 4,853,534 to Dakin; and 4,885,462 to Dakin.

As above indicated, a substantial body of prior art exists evidencing interferometric systems that are useable for position sensing; surface sensing; employ feedback to control microphonics and thermal-induced fiber variations; and also employ piezoelectric feedback compensation. However, a need still exists for an optical interferometer that is capable of detecting both AC and DC dimensional variations; exhibits low drift; and is inexpensive and of simple design.

Accordingly, it is an object of this invention to provide an optical interferometer that exhibits low drift and is particularly adapted to position displacement measurements.

It is another object of this invention to provide an optical interferometer that is able to reliably detect both AC, DC and quasi-DC dimensional changes.

SUMMARY OF THE INVENTION

A differential fiber interferometer includes first and second optical fibers that pass through a coupler which has both input and output ends. A laser optically energizes a first one of the fibers and, via the coupler, the second fiber. A telescope lens system focuses optical beams from the first and second fibers onto an object and receives reflections therefrom for retrotransmission. The object is caused to oscillate at a first frequency so as to modulate the phase difference between the reflected optical beams. An optical sensor, positioned on the input side of the coupler, converts to electrical signals the reflected optical energy that appears on the second fiber. The reflected energy includes optical energies incident from both the first and second fibers and reflected off the object. A first detector is responsive to the sensor's electrical outputs to produce a signal that is proportional to the differential phase between the reflected optical energies. A second feedback detector is coupled between the sensor and the second fiber and phase adjusts optical signals on the second fiber to compensate for environmental fluctuations of the fibers.

DESCRIPTION OF THE DRAWINGS

FIG. 1 is a block diagram illustrating a feedback-controlled differential, fiber interferometer that incorporates the invention hereof.

FIG. 3 is a perspective of a surface acoustic wave device whose surface deformations are detected by the system of FIG. 1.

DETAILED DESCRIPTION OF THE INVENTION

Figure 2:
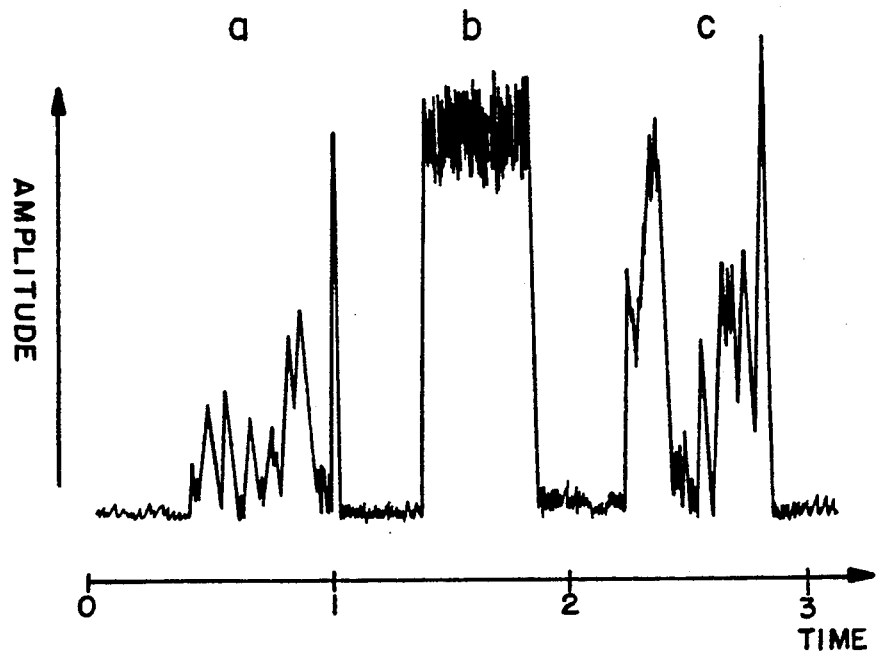
FIG. 2 is a plot of sensed vibration signal amplitude over time, with the feedback compensation both present and absent.

Referring now to FIG. 1, a CW laser 10 provides a collimated, polarized optical beam for the interferometric system. A fiber 12 transmits the beam from CW laser 10 to an optical isolator 14 that serves to reject unwanted reflected energy from passing back into laser 10. A fiber 16 connects optical isolator 14 to the input end of a 3 dB fiber-optic directional coupler 18. A second fiber 20 also passes through directional coupler 18. Within directional coupler 18, one half of the input energy appearing on fiber 16 is transferred into fiber 20. Fiber 20, after it exits from the output side of directional coupler 18, passes through a piezoelectric stretcher 22 before arriving at a lens-telescope arrangement 24. Fiber 16 passes directly to lens-telescope arrangement 24.

Because fibers 16 and 20 are positioned on either side of the center line 26 of telescope 24, the focused beams created thereby (i.e. 28 and 30) are focused at spatially separated points on atomic force probe 32. Probe 32 is positioned over a substrate 34 and detects its surface contours. An actuator 36 has applied thereto a dither signal $w_s$ which results in probe 32 being reciprocally oscillated in the vertical direction. This effects a modulation of beams 28 and 30 (in addition to the modulation thereof which is created as a result of the movements of probe 32—caused by the atomic force microscope—over the surface of sample 34).

Modulated beams 28 and 30 are retro-reflected back through telescope 24 and into fibers 16 and 20. The reflected signals are cross coupled in directional coupler 18 so that fiber 20 (at the input side of directional coupler 18) contains energies from retro reflected modulated beams 28 and 30 appearing on fibers 16 and 20.

The complex optical signal on fiber 20 is focused on an optical sensor 40 which converts the optical signal to an electrical signal. The output signal from sensor 40 is fed to a pair of lock-in detectors 42 and 44. Lock-in detector 42 is connected to a dither oscillator 46 which produces a dither frequency $w_s$, which signal is applied both to lock-in detector 42 and actuator 36. In the known manner, the application of the $w_s$ signal to lock-in detector 42 enables the extraction of the amplitude of the signal at frequency $w_s$ present in the output of optical sensor 40. Changes in that signal, created as a result of movement of probe 32, are then provided as an output to display system 50.

The signal from optical sensor 40 that is fed to lock-in detector 44 is used to provide a feedback signal to piezostretcher 22. The feedback enables an adjustment of the phase shift on fiber 20 to eliminate microphonic and other thermally induced disturbances. A modulation oscillator 52 provides an output signal of frequency $w_m$ to one side of differential amplifier 54 and to a 2x frequency multiplier 56. As a result, a reference signal of frequency $2w_m$ is applied to lock-in detector 44, thereby enabling it to detect any signal appearing at its input that exhibits a $2w_m$ frequency. The output from lock-in detector 44 is a level that varies with the amplitude of the $2w_m$ signal, which level is applied as a second input to differential amplifier 54, whose output, in turn, controls the action of piezostretcher 22.

To arrive at an understanding of the operation of the system, reflected beams $E_1$, $E_2$ appearing respectively on fibers 16 and 20 can be represented by equations 1 and 2 below.

$$E_1 = \exp j \, (w_o t + b_1 \sin w_s t + g_1) \quad (1)$$

$$E_2 = \exp j \, (w_o t + a \sin w_m t + b_2 \sin w_s t + g_2) \quad (2)$$

where:
 $w_o$ = optical frequency of laser
 $w_m$ = modulator oscillator 52 frequency
 $w_s$ = Dither oscillator 46 frequency
 $g_1$ = thermally dependent fluctuation or fiber 16
 $g_2$ = thermally dependent fluctuation of fiber 20

The intensity output of optical sensor 40 that results from the beam on fiber section 20 may be expressed as follows:

$$\text{Intensity } \alpha \{2 + 2 \cos (a \sin w_m t + b \sin w_s t + g)\} \quad (3)$$

where:
 $b = b_2 - b_1$
 $a$ = phase modulation due to modulator
 $g = g_1 - g_2$
 b is the difference in the sample-induced phase modulation between the beams on fibers 16 and 20, and "a" is the phase modulation of the beam due to the modulation signal $w_m$. The environmentally dependent phase fluctuation that occurs between fibers 16 and 20 is expressed as g and is the difference between $g_1$ and $g_2$. Note that the provision of fibers 16 and 20 enables a differential combination of the optical beams appearing thereon, and the nulling of common perturbations.

Equation 3 can be expanded as follows:

$$\text{Int} \propto \{2 + 2[\cos(a \sin w_m t + b \sin w_s t)] \cos g - 2[\sin(a \sin w_m t + b \sin w_s t)] \sin g\} \quad (4)$$

It can be shown that when the terms contained in the first pair of square brackets (i.e., cos (a sin $w_m t$+b sin $w_s t$)) are expanded, the result includes signals at both $2w_m$ and $2w_s$ frequencies. By contrast, the terms contained in the second pair of square brackets, (i.e., sin (a sin $w_m t$+b sin $w_s t$)) expand to include maximized values of $w_s$ and $w_m$. The terms within both brackets are multiplied by a fluctuating term, i.e., sin g and cos g, respectively. As a result, the stability of the system depends upon the control of the values of sin g and cos g. Therefore, arranging for the cancellation of the $2w_m$ signal frequencies is equivalent to setting cos g=0. Since the terms in the second square bracket give rise to a maximum signal level at $w_s$, the resulting output signal is enhanced and the stability of the system is improved.

The cancellation of the $2w_m$ frequency components is achieved through the operation of lock-in detector 44 in combination with differential amplifier 54. The intensity signal is fed from optical sensor 40 to lock-in detector 44. The $2w_m$ reference signal causes lock-in detector 44 to provide a corresponding, slowly varying output (i.e. DC or quasi-DC) to the negative input of operational amplifier 54. That output is proportional to the level of the $2w_m$ frequency components received from optical sensor 40. Modulation oscillator 52 provides a signal of frequency $w_m$ to the positive input of differential amplifier 54. As a result, the signal applied by differential amplifier 54 to piezoelectric stretcher 22 is the difference between the two aforementioned signals. As the output from lock-in detector 44 increases, indicating an increase in $2w_m$ frequency components, the output of differential amplifier 54 is driven more negatively (and vice-versa).

The compensation system operates in the following manner. If the $2w_m$ component in the input to lock-in detector 44 is at a minimum or is equal to zero, then the output from differential amplifier 54 is merely a signal having a frequency $w_m$ which modulates piezostretcher 22. Thus, if no atmospheric or acoustic perturbations occur resulting in a changed level of the $2w_m$ signal, the output from differential amplifier 54 merely creates a modulating effect on the optical signal in fiber 18. Assuming the presence of a microphonic perturbation, the $2w_m$ component fed to lock-in detector 44 will tend to increase. Accordingly, the output from lock-in detector 44 will increase in a like fashion, causing the output from differential amplifier to trend in the negative direction. The resulting negative signal will operate piezostretcher 22 in such a direction as to negate the $2w_m$ perturbation. In effect, piezostretcher 22 modifies the length of optical fiber 18 in a direction so as to compensate for the phase shift created by the perturbation.

It should be noted that due to the close proximity of fibers 16 and 20, the term g does not vary greatly. The operation of the feedback, is thus to eliminate residual variations due to microphonics. As a result, this system is capable of both high and low frequency (i.e. pseudo-DC) phase fluctuations.

The system was used to detect minute phase variations by focusing beams 28 and 30 onto a 150 micron silicon cantilever which was glued on one end to a piezoelectric bimorph. The bimorph was driven at a resonance frequency of the cantilever causing it to perform tuning fork-like vibrations. One of the optical spots was arranged to be close to the fixed end and the other spot was focused near the free end. A chart recorder was used to plot the variation of the signal at the vibration frequency with time. The input signal to the bimorph was a 150 kHz sinusoid.

FIG. 2 shows the resulting plot. The plot shows the response of the system, first with the feedback loop open, then closed, and finally open again. The plot was taken in a 30 Hz bandwidth. As can be seen from the part of the plot labelled b, the system succeeded in detecting the resulting vibration and, with the application of the feedback signal, the output was completely stabilized. The amount of sample vibration was independently determined, using a heterodyne interferometer, to be 0.02 nanometers. One aspect of this result was that even with the feedback loop open, the variation in the output was quite slow, as expected from the differential nature of the system. Thus, although application of the feedback signal is necessary over long scan times, the time constant associated with feedback circuit can be long. Hence, the system can be used to measure pseudo-DC vibrations. Further stability improvements can be achieved by enclosing both fiber 16 and 20 in a common protective sheath—to enable common mode cancellations.

Turning now to FIG. 3, a surface acoustic wave device 60 is shown having interdigitated electrodes 62 and 64. In lieu of using beams 28 and 30 to examine an oscillating atomic force microscope probe, those beams can be employed to detect surface variations on SAW device 60. Another application for this interferometer is the sensing (remotely) of thin film etching/growth in liquids or in a vacuum.

Figure 4:
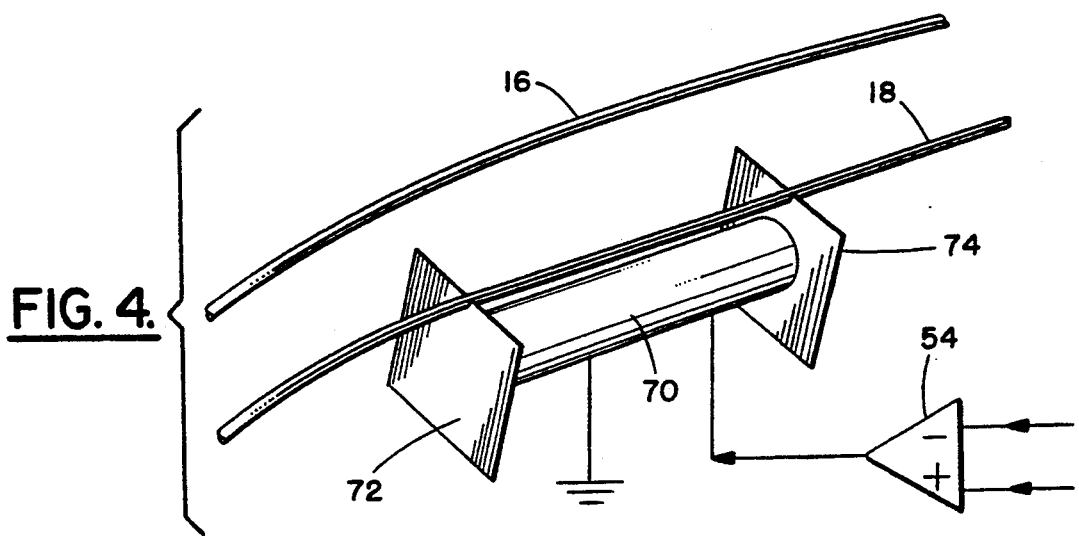
FIG. 4 is a schematic of a piezoelectric fiber stretcher useable with the system of FIG. 1.
Figure 5:
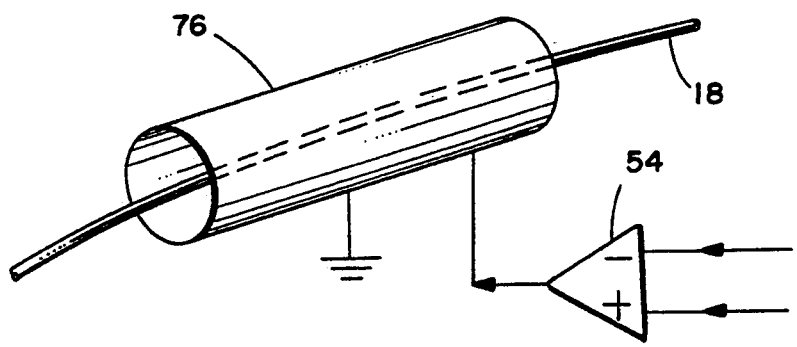
FIG. 5 is a schematic of a further type piezoelectric fiber stretcher useable with the system of FIG. 1.

FIGS. 4 and 5 illustrate two varieties of piezostretchers 22 that are useful with this invention. In FIG. 4, a piezoelectric stack 70 expands or contracts to cause the movement of end plates 72 and 74. Fiber 18 is rigidly attached thereto and has it length altered accordingly. FIG. 5 illustrates a piezo-type actuator 76 wherein fiber 18 is attached along its length to the tube. As a result, actuations of tube 76 create a change in length of fiber 18.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:
1. A fiber interferometer comprising:
   first and second optical fiber means;
   coupling means having input and output ends, for bilaterally coupling optical signals between said first and second optical fiber means, said optical fiber means passing through said coupling means;
   lens means for focussing optical energy from said first and second fiber means onto an object at physically separate points and for transmitting to said first and second fiber means reflected optical energy from said physically separate points on said object;

means for causing said object to physically oscillate at a first frequency;

sensor means for converting into electrical signals, optical energy on said second fiber means appearing at the input side of said coupling means, said optical energy including reflected optical energies from both said first and second optical fiber means;

first detector means responsive to said electrical signals for producing an output related to a differential phase between said reflected optical energies from said first and second optical fiber means, and second detector means coupled between said sensor means and said second fiber means, for phase adjusting optical signals on said second fiber means to compensate for phase changes due to environmental fluctuations of said second fiber means.

2. The fiber interferometer as recited in claim 1 wherein said second detector means comprises:

an oscillator for generating a modulation frequency signal $w_m$;

lock-in means for producing a feedback signal proportional to a level of a $2w_m$ frequency signal in said electrical signals from said sensor means;

phase shift means coupled to said second fiber means; and differential means responsive to said oscillation signal $w_m$ and said feedback signal from said lock-in means for operating said phase shift means to reduce the level of said $2w_m$ frequency signals.

3. The fiber interferometer as recited in claim 2 wherein said phase shift means physically changes a length of said fiber means to alter a phase shift therethrough.

4. The fiber interferometer as recited in claim 3 wherein said phase shift means comprises:

an electroactive actuator connected to said differential means, said electroactive actuator connected to said fiber means and operative to alter its length in response to output levels from said differential means.

5. The fiber interferometer as recited in claim 4, wherein said electroactive actuator is piezoelectric and said second fiber means is physically connected thereto, so that when said actuator is energized to cause a dimensional change therein, said second fiber means is similarly dimensionally changed.

6. The fiber interferometer as recited in claim 4, wherein said lock-in means is:

a lock-in amplifier that produces a signal proportional to the level of said $2w_m$ signal and said differential means is a differential amplifier that produces a signal output of frequency $w_m$ whose amplitude level is proportional to the difference between its inputs.

7. The fiber interferometer as recited in claim 6 wherein said first detector means comprises:

a lock-in amplifier having as one input a signal at said first frequency and as another input, the electrical signals from said sensor means.

8. The fiber interferometer as recited in claim 7 wherein said object is a probe in an atomic force microscope.

9. The fiber interferometer as recited in claim 7 wherein said object is a surface acoustic wave device wherein acoustic signals propagate and are sensed by an optical beam focussed on a surface thereof.

* * * * *